Aug. 19, 1924.

F. D. HOLDSWORTH 1,505,892

PORTABLE COMPRESSING APPARATUS

Filed March 5, 1918     3 Sheets-Sheet 1

Inventor:
Fred D. Holdsworth
by
Atty.

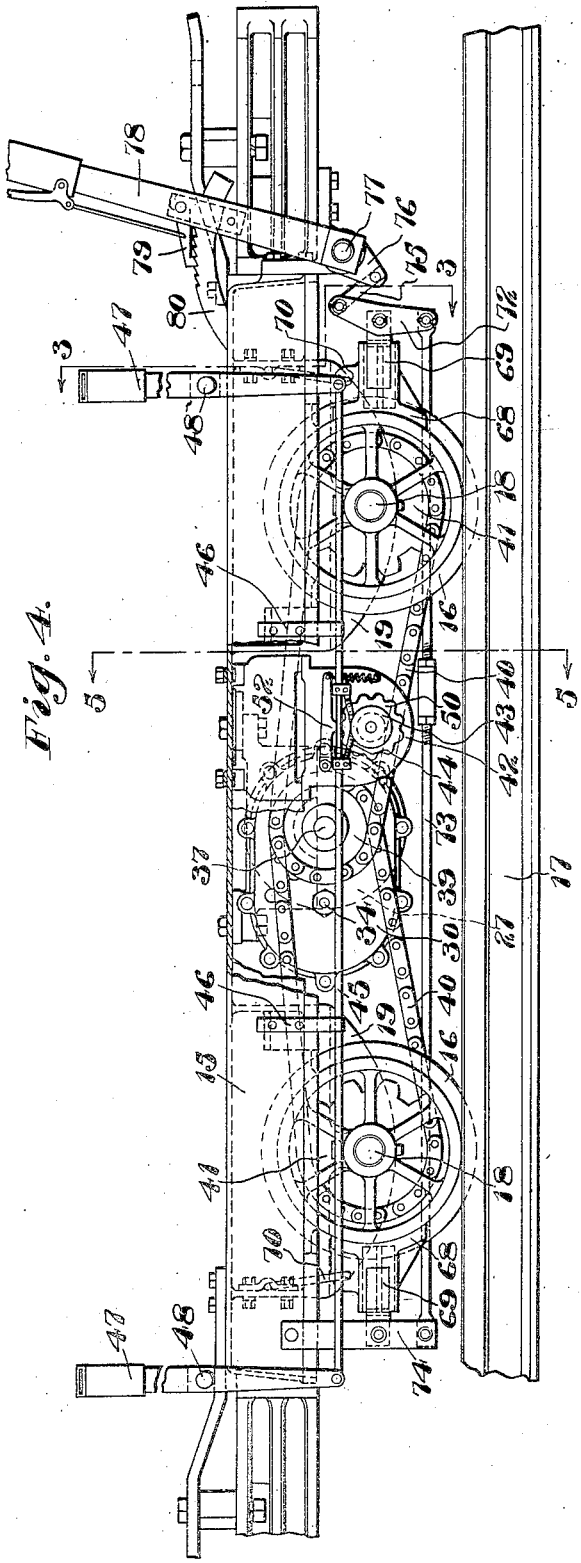

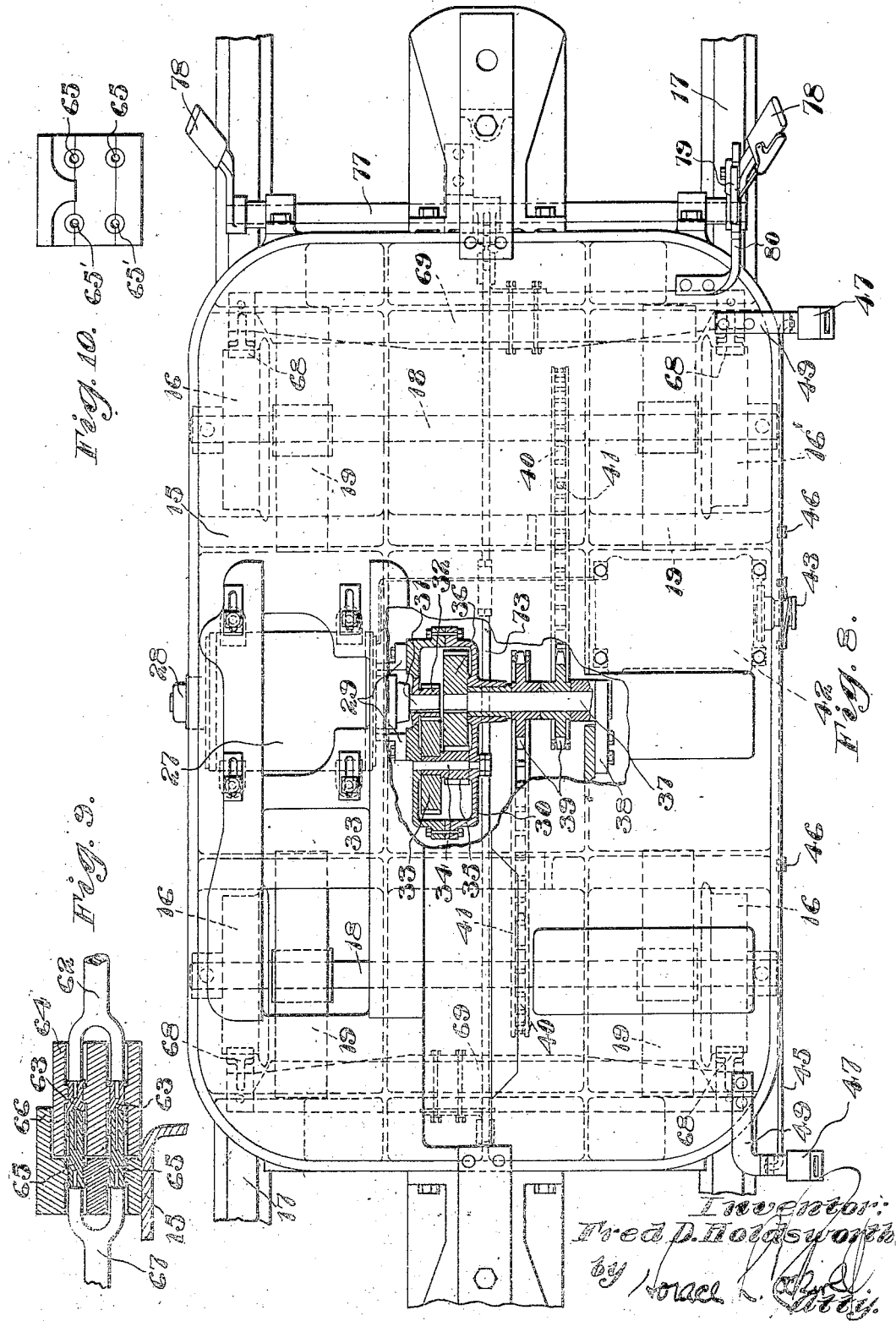

Patented Aug. 19, 1924.

1,505,892

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

PORTABLE COMPRESSING APPARATUS.

Application filed March 5, 1918. Serial No. 220,603.

*To all whom it may concern:*

Be it known that I, FRED D. HOLDSWORTH, a citizen of the United States, residing at Claremont, in the county of Sullivan and State of New Hampshire, have invented certain new and useful Improvements in Portable Compressing Apparatus, of which the following is a full, clear, and exact specification.

This invention relates to portable compressing mechanism employed to supply compressed air or the like to mining, quarrying, or other machines, or for other purposes, said mechanism being adapted to be conveniently transported to and from the points at which the compressed air is to be used.

The invention has for its object to provide a truck-mounted compressing apparatus capable of traveling under its own power to and from its points of utilization, said apparatus comprising means for supplying motive energy to either the compressing mechanism or the propelling mechanism, according as the apparatus is performing its compressing function or is being transported from place to place, said apparatus also having means whereby it may be conveniently and reliably controlled, and being of a simple and compact construction wherein the compressing and propelling mechanism may each perform its intended function in an efficient manner without interference by the other.

The foregoing and other objects of the invention, together with means whereby the same may be carried into effect, will best be understood from the following description of one form or embodiment thereof illustrated in the accompanying drawings.

In said drawings,—

Fig. 4 is an enlarged side elevation, partly broken away, of the truck with the compressing mechanism removed.

Fig. 5 is a transverse section taken substantially on line 5—5 of Fig. 4.

Fig. 6 is an enlarged vertical sectional view of the operating and positioning means for the controller for the truck propelling motor.

Fig. 7 is a plan view of the parts shown in Fig. 6 as viewed from the line 7—7 in the latter view.

Fig. 8 is a plan view of the truck, the compressor mechanism being omitted, a portion of the truck platform being broken away, and a portion of the transmission mechanism being shown in horizontal section.

Fig. 9 is an enlarged vertical section of the connector whereby energy may be supplied to either of the motors of the apparatus.

Fig. 10 is a front elevation of the fixed terminal member shown in Fig. 9.

Figure 1:
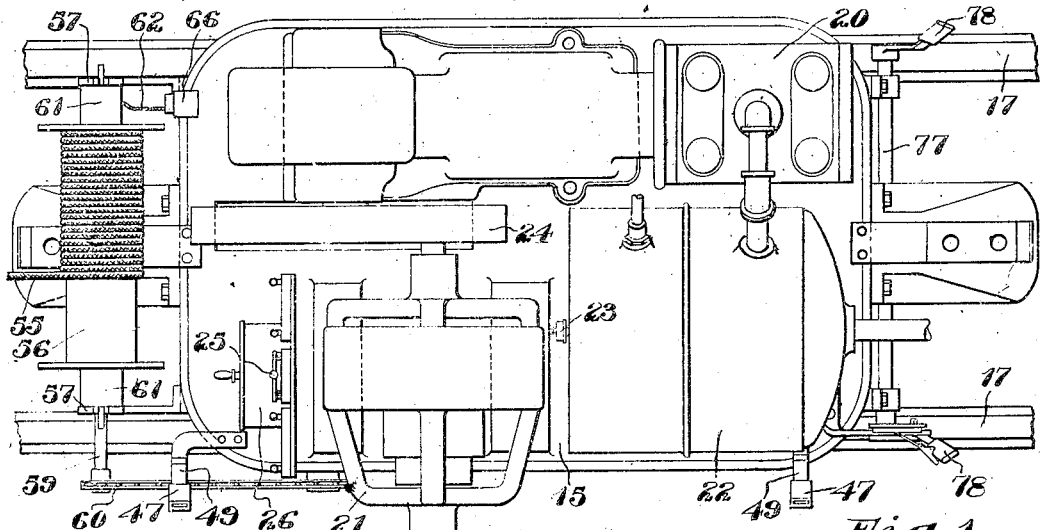
Fig. 1 is a plan, and Fig 2 a side elevation, of the complete apparatus.
Figure 2:
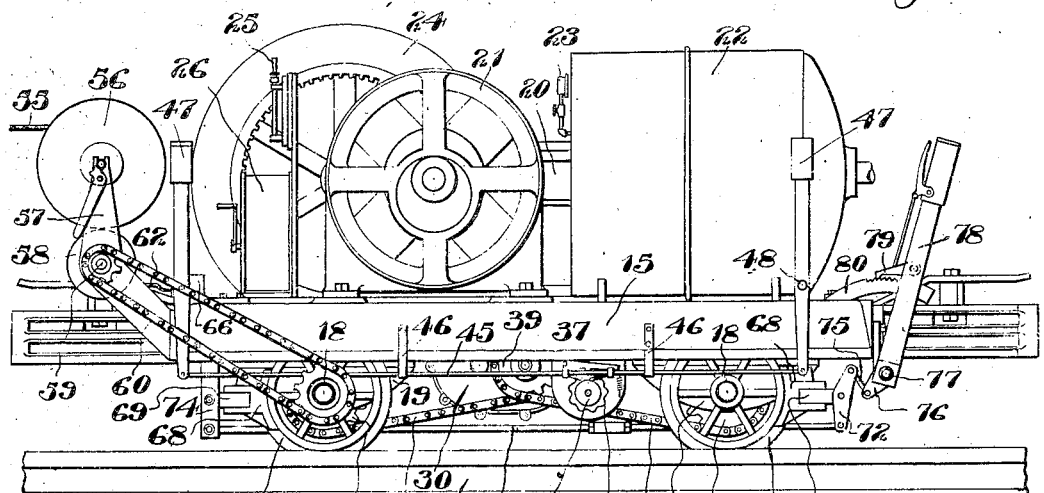
Figure 3:
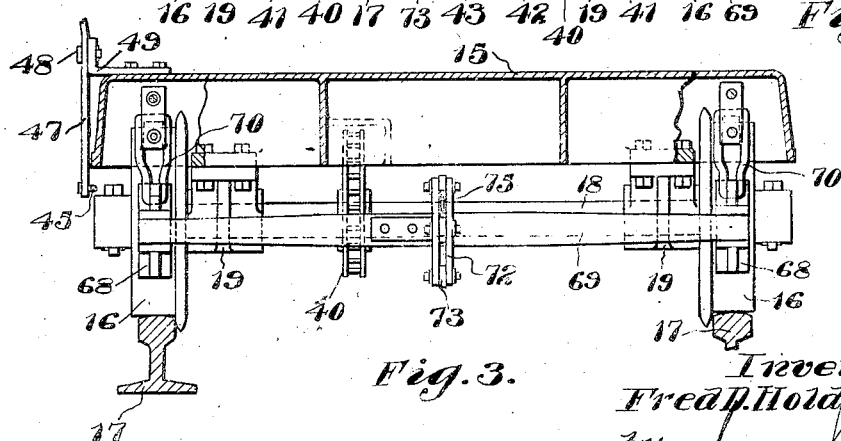
Fig. 3 is a vertical transverse section on a somewhat enlarged scale, taken substantially on line 3—3 of Fig. 4.

Referring to Figs. 1 and 3, the truck comprises a body having a platform 15, said body being mounted on wheels 16, preferably adapted to run on rails 17, said wheels being fixed to axles 18 journaled in suitable bearings 19 on the truck body.

Mounted on the truck platform 15, is a compressing mechanism which, specifically, forms no portion of the present invention and, except as hereinafter pointed out, may be of any suitable character. For convenience, there is illustrated herein a compressing mechanism of a well known type comprising a reciprocating compressor 20 driven, through suitable transmission mechanism 24, by an electric motor 21 and adapted to deliver compressed fluid into a receiver 22, preferably provided with a suitable gage 23.

Current for actuating the motor 21 is delivered thereto, by means hereinafter more fully described, through a cut-out switch 25 and is regulated by a manually operable controller 26 of any suitable or well known type.

Bolted or otherwise secured to the under side of the platform 15, is a motor casing 27 (see Figs. 4, 5, and 8) containing an electric motor 28. Secured to the lateral face of the motor casing 27, as by bolts engaging flanges or projections 29 on said motor casing, is a gear casing 30, preferably, for convenience in assembling, formed in two parts suitably bolted or otherwise secured together. The end of the shaft 31 of the motor 28 is journaled in the gear casing 30 and has fast thereon a pinion 32 which meshes with a gear 33 loosely mounted on a stud shaft 34 supported by the walls of the gear casing 30, said gear 33 having a pinion portion 35 which meshes with a gear 36 fast on the end of a transmission shaft 37 journaled in the gear casing 30 and in a bearing carried by a bracket 38 bolted or otherwise secured to the under side of the truck platform 15. Fixed on the transmission shaft 37 are two sprockets 39 connected by chains 40 with sprockets 41 fast on the axles 18.

Electric current is supplied to the motor 28, from a source hereinafter further described, through a rotary controller 42 of any suitable type, said controller being preferably of such character as, by proper adjustment in one direction or the other, to cause actuation of said motor in either direction or at any desired speed within the limits of the apparatus. The rotary member of the controller is provided with a drum 43 (see Figs. 6 and 7) about which is wound a chain or other flexible connector 44 the ends of which are secured to a rod 45 extending longitudinally of the truck and longitudinally movable, as in guides 46 secured to the truck body. The rod 45 is pivoted at its ends to levers 47 located adjacent the opposite ends of the truck body and pivoted, as at 48, to brackets 49 secured thereto, whereby said controller may be conveniently moved in either direction from either end of the truck. Also secured to the rotary member of the controller, is a disk 50 having a notched periphery the notches of which are sucessively engaged, as the controller is rotated, by a tooth 51 on a lever 52 pivoted at 53 to the controller casing and normally pressed toward said disk by means of a spring 54 secured at one end to said lever and at the other to the controller casing, said parts serving to position the controller and retain the same in any adjustment into which it may be moved.

Current is supplied to the apparatus through a suitable flexible conductor or cable 55 which is wound on a reel 56 journaled in suitable brackets 57 supported by the truck body, said reel being rotated, as the truck moves, in order to take up the slack in the cable 55 and maintain the same under a slight tension, by means of a friction wheel 58 mounted on a shaft 59 journaled in one of the uprights 57 and operatively connected with one of the truck axles 18 by means of chain and sprocket gearing 60, said friction wheel 58 engaging at its periphery the periphery of one of the end members of the reel 56. Current supplied to the reel 56 through the cable 55 is transmitted therefrom, through suitable slip ring devices 61, to a conductor 62 adapted to be connected, by means hereinafter described, with the compressor and propelling motors 21 and 28, respectively. The cable reel and associated parts thus far referred to specifically form no portion of the present invention, and, being well known in the art, require no further description.

The conductor 62 is provided with a pair of terminals 63 (see Fig. 9) in the form of socket members retained in spaced relation in a suitable block or handle 64. The terminal members 63 are adapted to cooperate with either one of two pairs of cooperating terminals 65, 65', (see Fig. 10) herein shown as comprising resilient pins or plugs supported by a block or bracket 66 bolted or otherwise secured to the truck body. Each pair of terminals 65 and 65' is connected to a cable or conductor 67, that connected with the terminals 65 leading to the motor 21, and that connected with the terminals 65' leading to the motor 28. From the foregoing, it will be seen that, by connecting the terminals 63 with the terminals 65, current will be supplied to the motor 21 to actuate the compressor mechanism, while by connecting said terminals 63 with the terminals 65', current will be supplied to the motor 28 to propel the truck.

Arranged adjacent to each of the axles 18 is a brake beam 69 (see Figs. 2, 3, 4, and 8) supported by hangers 70 from the truck body, each of said brake beams carrying a pair of brake shoes 68 cooperating with the corresponding truck wheels 16, respectively. Pivoted intermediate its ends to one of the brake beams 69, is a lever 72 one end of which is connected by a rod 73 with one end of a lever 74 fulcrumed at its opposite end to the truck frame and pivoted intermediate its ends to the other brake beam 69. The opposite end of the lever 72 is connected by a link 75 with an arm 76 on a rock shaft 77 extending transversely of the truck body and journaled in suitable bearings thereon. Keyed or otherwise secured to the shaft 77 at either end thereof, is a hand lever 78, each of said hand levers being preferably provided with a latch 79 cooperating with a locking segment 80. By means of the foregoing mechanism it will be seen that the brakes may be operated from either side of the truck, and that when said brakes are set all of the brake shoes 68 will engage their wheels 16 with an equal pressure.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination with a truck and unitary compressing mechanism thereon, of unitary mechanism for propelling said truck, and means for alternatively supplying power to said mechanisms, respectively.

2. The combination with a truck, a compressor thereon, a motor on said truck for actuating said compressor, a reel on said truck, and a conductor on said reel, of a second motor on said truck for propelling the same, and means for alternatively connecting said conductor with said motors, respectively.

3. The combination with a truck, a compressor thereon, a motor on said truck for actuating said compressor, and a conductor leading from a source of energy to said truck, of a second motor on said truck for propelling the same, and a connector comprising a terminal on said conductor and a pair of terminals communicating with said motors respectively and alternatively engageable by said conductor terminal.

4. The combination with a truck, a compressor thereon, a motor on said truck for actuating said compressor, a reel on said truck, and a conductor on said reel, of a second motor on said truck for propelling the same, a conductor leading from said reel, and a connector comprising a terminal on said last named conductor and a pair of terminals communicating with said motors respectively and alternatively engageable by said conductor terminal.

5. The combination with a truck and compressing mechanism thereon, of independent mechanism for propelling said truck, means for alternatively supplying power to said mechanisms, respectively, and devices for independently controlling said mechanisms, respectively.

6. The combination with a truck, a compressor thereon, and an electric motor on said truck for actuating said compressor, of a second motor on said truck for propelling the same, a conductor leading from a source of electric energy to said truck, and means for alternatively connecting said conductor with said motors, respectively.

7. The combination with a truck, a compressor thereon, an electric motor on said truck for actuating said compressor, a cable reel on said truck, and a conducting cable leading from a source of electric energy and wound on said reel, of a second electric motor on said truck for propelling the same, a conductor leading from said reel, and a connector comprising a terminal on said conductor and a pair of terminals communicating with said motors respectively and alternatively engageable by said conductor terminal.

8. A wheeled truck of the character described having a platform, a motor casing secured to the under side of said platform, a motor in said casing, a gear casing, and means operatively connecting said motor with the wheels of said truck including transmission mechanism in said gear casing, said gear casing being secured to said motor casing and removable as a whole therefrom.

9. A wheeled truck of the character described having a platform and a pair of axles, a sprocket on each of said axles, a motor carried by said platform at the under side thereof, a transmission shaft geared to said motor, a pair of sprockets on said transmission shaft, chains connecting said last named sprockets with said first named sprockets, respectively, and a compressing unit mounted on said platform.

10. A wheeled truck of the character described having a platform and a pair of axles, a sprocket on each of said axles, a motor casing secured to the under side of said platform, a motor in said casing, a gear casing secured to said motor casing, a motor shaft journaled in said gear casing, transmission mechanism in said gear casing and including a transmission member on said motor shaft, a bearing secured to the under side of said platform, a transmission shaft journaled in said gear casing and in said bearing and having secured thereto one of the members of said transmission mechanism, a pair of sprockets on said transmission shaft, and chains connecting said last named sprocket with the sprockets on said axles, respectively.

11. A truck having a platform, running gear supporting said platform and comprising a plurality of axles, a motor intermediate said axles and below said platform, a controller for said motor located below said platform and intermediate said axles, and devices located at the opposite ends of said truck, respectively, for operating said controller.

12. The combination with a truck, a compressor thereon, and a motor on said truck for actuating said compressor, of a second motor on said truck for propelling the same, a controller for said last named motor located intermediate the ends of said truck, devices located at opposite ends of said truck, respectively, for operating said controller, a second controller for said first named motor, and means for alternatively supplying power to said motors, respectively.

13. A wheeled truck of the character described having a platform, a motor carried by said platform at the under side thereof, transmission mechanism at the under side of said platform and operatively connected with said motor and with the wheels of said truck, a controller for said motor located on the under side of said platform intermediate the ends thereof, a rod extending longitudinally of the platform and having a connection with said controller intermediate its ends, and devices located at the opposite ends of said platform and cooperating with said rod for operating said controller.

14. A truck comprising a wheel supported platform and provided with a motor for propelling the same, a controller for said motor disposed beneath said platform, an operating device for said controller located at a distance therefrom and operable from the top of said platform, operative connections between said operating device and said controller, and means cooperating with said controller and automatically operative to maintain the same in any one of a plurality of different positions upon adjustment thereto by said operating device.

15. A truck provided with a motor for propelling the same, a rotary controller for said motor located at substantially the longitudinal center of said truck, a drum carried by the rotary member of said controller, a flexible connector wrapped about said drum, a longitudinally movable rod extending longitudinally of said truck and connected to the opposite ends of said flexible connector, and levers located at opposite ends of said truck, respectively, and operatively connected with said rod.

16. The combination with a mining truck having a short wheel base and a relatively short platform thereon, of a compressing unit mounted upon said platform and extending substantially the full length thereof, and a truck driving unit beneath said platform and comprising a motor and a motor controller carried by said platform intermediate the ends thereof.

17. The combination with a mining truck having a short wheel base and a relatively short platform thereon, of a compressing unit mounted upon said platform and extending substantially the full length thereof; and a truck driving unit beneath said platform and comprising a motor, a motor controller carried by said platform intermediate the ends thereof, and a motor controlling means operable from either end of said platform at a point above the level of said platform.

18. The combination with a mining truck having a short wheel base and a relatively short platform thereon, of a compressing unit mounted upon said platform and extending substantially the full length thereof; a truck driving unit beneath said platform and comprising a motor, a motor controller carried by said platform intermediate the ends thereof, and a motor controlling means operable from either end of said platform at a point above the level of said platform; and a braking means swung beneath and operable from either side of the truck platform.

In testimony whereof I affix my signature.

FRED D. HOLDSWORTH.